United States Patent
Double et al.

(10) Patent No.: US 9,540,532 B2
(45) Date of Patent: Jan. 10, 2017

(54) INKS FOR INK-JET PRINTING

(71) Applicant: FUJIFILM Imaging Colorants, Inc., New Castle (DE)

(72) Inventors: Philip Double, Manchester (GB); Janette Cordwell, Manchester (GB); Marie Holmes, Manchester (GB); Ajay Popat, Manchester (GB)

(73) Assignee: FUJIFILM Imaging Colorants, Inc., New Castle, DE (US)

( * ) Notice: Subject to any disclaimer, the term of this patent is extended or adjusted under 35 U.S.C. 154(b) by 0 days.

(21) Appl. No.: 14/421,491

(22) PCT Filed: Aug. 5, 2013

(86) PCT No.: PCT/GB2013/052086
§ 371 (c)(1),
(2) Date: Feb. 13, 2015

(87) PCT Pub. No.: WO2014/027179
PCT Pub. Date: Feb. 20, 2014

(65) Prior Publication Data
US 2015/0184013 A1    Jul. 2, 2015

(30) Foreign Application Priority Data

Aug. 15, 2012 (GB) .................................. 1214552.0

(51) Int. Cl.
| C09D 11/328 | (2014.01) |
| C09D 11/36 | (2014.01) |
| C09D 11/40 | (2014.01) |
| C09D 11/38 | (2014.01) |

(52) U.S. Cl.
CPC ............ C09D 11/40 (2013.01); C09D 11/328 (2013.01); C09D 11/36 (2013.01); C09D 11/38 (2013.01); *Y10T 428/24802* (2015.01)

(58) Field of Classification Search
CPC ........ C09D 11/328; C09D 11/36; C09D 11/40
USPC ..................... 106/31.48, 31.49, 31.52, 31.58
See application file for complete search history.

(56) References Cited

U.S. PATENT DOCUMENTS

| 6,648,951 B2 * | 11/2003 | Chen | C09D 11/32 106/31.49 |
| 7,056,376 B2 * | 6/2006 | Popat | C09D 11/328 106/31.48 |
| 2004/0233263 A1 * | 11/2004 | Goto | C09D 11/40 347/100 |
| 2004/0233465 A1 * | 11/2004 | Coyle | B41M 3/008 358/1.9 |
| 2007/0091156 A1 * | 4/2007 | Jackson | C09D 11/328 106/31.58 |
| 2008/0280043 A1 * | 11/2008 | Moribe | C09D 11/40 106/31.13 |
| 2012/0306962 A1 * | 12/2012 | Holmes | C09D 11/40 106/31.52 |
| 2013/0286119 A1 | 10/2013 | Cordwell et al. | |

FOREIGN PATENT DOCUMENTS

| EP | 1203798 A1 | 5/2002 |
| EP | 1990382 A1 | 11/2008 |
| EP | 2412761 A1 | 2/2012 |
| WO | 2005080513 A1 | 9/2005 |
| WO | 2009115831 A1 | 9/2009 |
| WO | 2011104522 A1 | 9/2011 |
| WO | 2012/153119 A1 | 11/2012 |

OTHER PUBLICATIONS

Feb. 26, 2015 (WO) International Preliminary Report on Patentabilty and Written Opinion—App. No. PCT/GB2013/052086.
International Search Report issued from corresponding PCT/GB2013/052086, dated Sep. 30, 2013.

\* cited by examiner

*Primary Examiner* — Helene Klemanski
(74) *Attorney, Agent, or Firm* — Banner & Witcoff, Ltd.

(57) ABSTRACT

An ink composition comprising: a) 0.2 to 20 parts of one or more glycols selected from the group consisting of ethylene glycol, diethylene glycol, propylene glycol or dipropylene glycol; b) 30 to 50 parts of glycerol; c) 0.5 to 10 parts of 2-pyrrolidone; d) 0.5 to 9 parts of colorant; e) 30 to 70 parts of water; f) 0 to 3 parts of surfactant; g) 0 to 5 parts biocide; wherein all parts are by weight. Also ink-sets, printing processes and printed material.

14 Claims, No Drawings

INKS FOR INK-JET PRINTING

RELATED APPLICATION DATA

This application is a National Stage Application under 35 U.S.C. 371 of co-pending PCT application PCT/GB2013/052086 designating the United States and filed Aug. 3, 2013; which claims the benefit of GB application number 1214552.0 and filed Aug. 15, 2012 each of which are hereby incorporated by reference in their entireties.

This invention relates to inks and to ink-sets and their use in ink-jet printing, particularly in the commercial print sector.

Ink-jet printing (IJP) is a non-impact printing technique in which droplets of ink are ejected through a fine nozzle onto a substrate without bringing the nozzle into contact with the substrate.

Desktop printers are commonly used in the home and small offices to print, for example, family photographs, children's homework and documents having a small number of pages such as letters.

In contrast the commercial print sector uses larger ink-jet printers. These printers churn out vast quantities of documents such as telephone bills, utility bills, newspapers and books.

The print heads used in the commercial print sector are usually positioned in a wide, single array and are able to print substrates in a single pass. Commercial printers run continuously for long periods and so the inks need to be particularly stable since if even one nozzle becomes blocked this can lead to a blank band on a vast number of documents and the printer being off line while print head is cleaned. In contrast, desktop printers usually have a much narrower print head and print substrates in multiple passes such that it is less noticeable if a single nozzle becomes blocked.

Ink-jet printers in the commercial sector can print at high speeds, for example there are printers which are able to print 600×600 dpi resolution at a speed in excess of 200 meters/min. This imposes technical demands not present on desktop printers producing only a few pages per minute. Increasing print speed often means that the ink-jet ink should desirably dry more quickly such that the final print does not smudge when stacked. Inks with a quicker drying time, however, pose an increased risk of the ink drying and crusting over on the nozzles whilst the printer is not actively printing. To enable these printers to work at these high speeds the inks used must also show a low foaming potential and excellent drop formation.

The substrates used in the commercial print sector are also much more varied than those used in desktop. In the desktop sector, expensive glossy and special coated papers are used when printing photographs and the occasional short document. However in the commercial print sector, the high volume printing of, for example, utility bills, requires inexpensive substrates such as plain papers, thin paper of the kind used in newspapers and offset media which can be difficult to print effectively with aqueous inks. Customers in the commercial print sector expect inks to be suitable for a wide variety of substrates, from very thin absorbent substrates to substrates with much less absorbency. Thin substrates such as those used in newspapers can suffer from poor dot definition due to "feathering" of the ink across the paper. "Strike through" can also be a problem with conventional inks where the ink permeates right through the thin paper to become visible on the other side. Good drop definition and edge acuity are high priorities in the commercial print sector.

According to a first aspect of the present invention there is provided an ink composition comprising:
a) 0.2 to 20 parts of one or more glycols selected from the group consisting of ethylene glycol, diethylene glycol, propylene glycol or dipropylene glycol;
b) 30 to 50 parts of glycerol;
c) 0.5 to 10 parts of 2-pyrrolidone;
d) 0.5 to 9 parts of colorant;
e) 30 to 70 parts of water;
f) 0 to 3 parts of surfactant;
g) 0 to 5 parts biocide;
wherein all parts are by weight.

Preferably the ink composition has a viscosity of from 2.5 to 11 cP, more preferably of from 3 to 10 cP, especially of from 3.5 to 9 cP, more especially of from 4 to 8 cP, particularly of from 4 to 7 cP and more particularly of from 4 to 6 cP. The viscosity is measured at 32° C. using a Brookfield spindle 18 at 60 rpm.

Preferably the ink composition has a surface tension of from 25 to 45, more preferably of from 30 to 40 and especially of from 33 to 37 dynes/cm at 22° C. The surface tension of the ink composition is preferably measured using a Kibron Aquapi.

Preferably the ink composition has a pH of from 6 to 10, more preferably of from 6.5 to 9.5 and especially of from 7 to 8.5.

In this specification "parts by weight" is often abbreviated to just "parts" without any change in meaning.

Component a) is preferably present in the ink composition in an amount of from 1 to 15 parts, more preferably of from 2 to 10 parts by weight and especially of from 3 to 8 parts by weight.

Component a) is preferably diethylene glycol, propylene glycol or mixtures thereof, more preferably component a) is diethylene glycol.

Component b) is preferably present in the ink composition in an amount of from 35 to 45 parts by weight and more preferably of from 36 to 42 parts by weight.

Component c) is preferably present in the ink composition in an amount of from 1 to 8 parts by weight, more preferably of from 2 to 7 parts by weight, especially of from 3 to 6 parts by weight and more especially of from 4 to 6 parts by weight.

The amount of component d) included in the ink composition will depend to some extent on the intensity of colour required for the ink. Typically however component d) is present in an amount of from 0.6 to 8 parts by weight, more preferably of from 1 to 7.5 parts by weight and especially of from 2 to 5 parts by weight. Component d) may be a single colourant or a mixture of colourants.

Preferred colorants are dyes, especially water-soluble dyes. Acid and Direct dyes are particularly preferred and as examples there may be mentioned the dyes listed in the Colour Index International.

When component d) comprises a yellow colorant it is preferably selected from the group consisting of C.I. Direct Yellow 86, C.I. Direct Yellow 132, C.I. Direct Yellow 142, Acid Yellow 23 and Pro-Jet Yellow 746 and mixtures thereof, especially C.I. Direct Yellow 132.

When component d) comprises a magenta colorant it is preferably selected from the group consisting of Acid Red 249; a xanthene dye such as C.I. Acid Red 52; and monoazo dyes of Formula (1), and salts thereof:

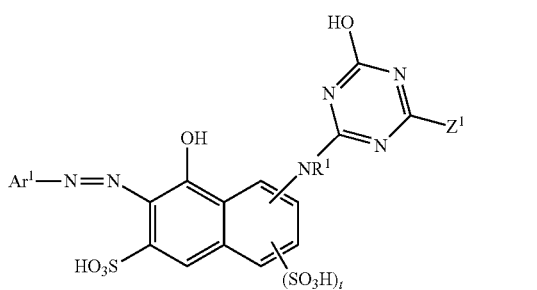

Formula (1)

wherein:
Ar¹ is optionally substituted phenyl or optionally substituted naphthyl;
Z¹ is an optionally substituted nitrogen containing heterocyclic group which is attached to the triazine ring by a bond to a nitrogen atom in the heterocyclic group;
R¹ is H or $C_{1-4}$-alkyl optionally substituted by —OH, —COOH or —SO₃H; and
t is 0 or 1:
and mixtures thereof.

Preferably Z¹ is an optionally substituted 5- or 6-membered heterocyclic group. It is especially preferred that Z¹ is free from primary or secondary amino groups. More especially Z¹ is morpholino or pyrrolidinyl each of which is optionally substituted by $C_{1-4}$-alkyl, carboxy or sulfo.

Preferred examples of groups represented by Ar¹ include 2-carboxyphenyl, 3,5-dicarboxyphenyl, 2-sulfophenyl, 3-sulfophenyl, 2-carboxy-4-sulfophenyl, 3,4-dimethyl-6-sulfophenyl, 4-amino-2-hydroxyphenyl, 4-carboxy-2-hydroxyphenyl, 1,5-disulfonaphth-2-yl, 1-sulfonaphth-2-yl, 3,6,8-trisulfonapth-2-yl, 8-hydroxy-2,4-disulfonaphth-1-yl, 1-amino-8-hydroxy-3,6-disulfonaphth-2-yl, 2-amino-8-hydroxy-6-sulfonaphth-1-yl, 2-amino-8-hydroxy-6-sulfonaphth-7-yl, 2-amino-8-hydroxy-3,6-sulfonaphth-1-yl or 6-sulfo-indan-5-yl. It is especially preferred that Ar¹ is phenyl or naphthyl each of which is optionally substituted by one or more of —OH, —SO₃H, —COOH, —NH₂, $C_{1-4}$-alkyl, $C_{1-4}$-alkoxy or nitro.

When t is 1 the floating sulfo group in Formula (1) is preferably attached at the 3- or 4-position in the naphthalene ring. More preferably t is 1 and the floating sulfo group is attached at the 3-position.

A particularly preferred dye of Formula (1) is of Formula (2) and salts thereof:

Formula (2)

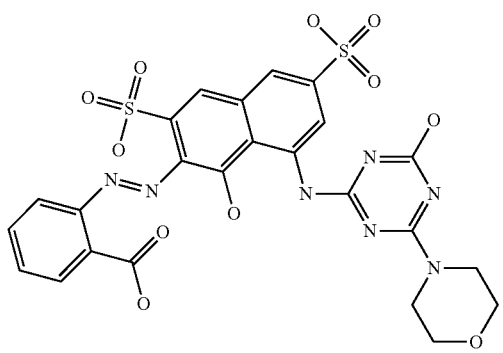

Compounds of Formula (1) may be prepared as described in U.S. Pat. No. 6,635,747 wherein the compound of Formula (2) is dye 6 and its preparation is described in Example 3, which is incorporated herein by reference.

Mixtures of two or more of Acid Red 249; xanthene dyes such as C.I. Acid Red 52; and monoazo dyes of Formula (1), and salts thereof may also be used When component d) comprises a cyan colorant it is preferably selected from the group consisting of C.I. Direct Blue 86, C.I. Direct Blue 199 and mixtures thereof, especially C.I. Direct Blue 199.

When component d) comprises a black colorant it is preferably selected from the group consisting of C.I. Direct Black 19, C.I. Direct Black 168, Mobay Black SP, Bayscript Black SP, Steiner Black SP, or a compound of the Formula (3) or (4) (whether in free acid or salt form) and mixtures thereof wherein Formula (3) is:

T-Q-N=N-L-T      Formula (3)

wherein:
each T independently is an azo containing group;
Q is an optionally substituted, optionally metallised 1,8-dihydroxynaphthyl group; and
L is a divalent organic linker group: and
Formula (4) is

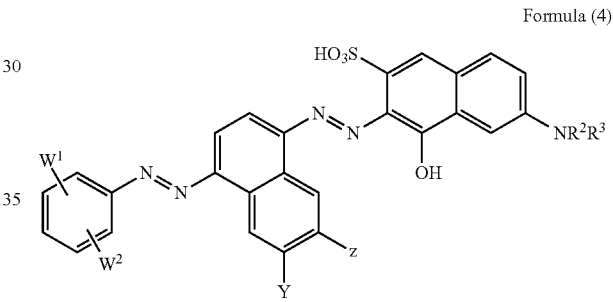

Formula (4)

wherein:
W¹ is carboxy;
W² is H, carboxy, sulfo, halo, hydroxy, $C_{1-4}$-alkoxy or $C_{1-4}$-alkyl;
Y and Z are each independently H, carboxy or sulfo; and
R² and R³ are each independently H, $C_{1-4}$-alkyl or $C_{1-4}$-alkyl carrying a carboxy or sulfo group.

In compounds of Formula (3) preferred azo groups represented by T are of the formula A-N=N— wherein each A independently is optionally substituted optionally phenyl or optionally substituted optionally substituted naphthyl. Examples of such groups are listed above for Ar¹.

In Formula (2) L is preferably of Formula (5):

-L¹(-G-L²)ₓ-      Formula (5)

wherein:
L¹ is a single covalent bond or optionally substituted phenyl or naphthyl;
L² is optionally substituted phenyl or naphthyl;
G is —O—, —NR⁴—, —N=N—, —NR⁴—CO—, —NR⁴CONR⁴—, —S—, —SO—, —SO₂—, —SO₂NR⁴ or CR⁴=CR⁴—, wherein each R⁴ independently is H or $C_{1-4}$-alkyl; and
X is 0, 1 or 2.

Preferred optional substituents on A, L, L¹, L² and Ar¹ include halogen (especially F and Cl), nitro, cyano, —CF₃, —OR⁵, —SR⁵, —NR⁶R⁷, —C(O)R⁵, —C(O)OR⁵, —SO$_2$R$^5$, —SOR$^5$ or C$_{1-6}$-alkyl optionally substituted by —OH, —SO$_3$H, —COOH, —PO$_3$H$_2$, C$_{1-4}$-alkoxy or hydroxy-C$_{1-4}$-alkylene-oxy;
wherein:
R$^5$ is H, C$_{1-6}$-alkyl optionally substituted by —OH, —SO$_3$H or —COOH, or phenyl optionally substituted by C$_{1-4}$-alkyl, —OH, —SO$_3$H, —COOH, —NH$_2$ or —NO$_2$;
R$^6$ and R$^7$ are each independently H, —CONH$_2$, C$_{1-6}$-alkyl optionally substituted by —OH, —SO$_3$H or —COOH, or phenyl optionally substituted by C$_{1-4}$-alkyl, —OH, —SO$_3$H, —COOH, —NH$_2$ or —NO$_2$; or
R$^6$ and R$^7$ together with the nitrogen to which they are attached form a 5- or 6-membered ring (preferably morpholine or piperazine).

Especially preferred optional substituents on A, L, L$^2$ and Ar$^1$ include one or more of C$_{1-4}$-alkyl, C$_{1-4}$-alkoxy, —OH, —COOH, —PO$_3$H$_2$, —SO$_3$H, nitro, —Cl, —F, —CF$_3$, amino and —COOC$_{1-4}$-alkyl.

Preferably the compound of Formula (3) is

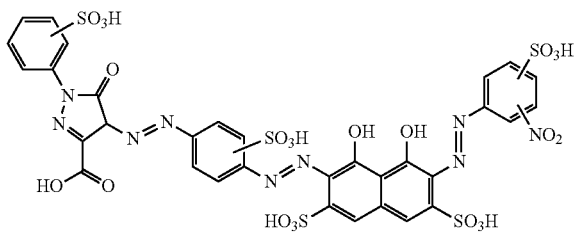

Compounds of Formula (3) may be prepared as described in U.S. Pat. No. 7,056,376 which is incorporated herein by reference.

Preferably the compound of Formula (4) contains at least as many carboxy groups as sulfo groups.

The compounds of Formula (4) may be prepared as described in U.S. Pat. No. 5,203,912.

The black colorant preferably comprises Direct Black 168 and/or Direct Black 19. The black colourant may also comprise a small amount of another coloured dye for shading purposes. In one preferred embodiment the black colourant is Direct Black 168 and in another preferred embodiment the black colourant is a mixture of Direct Black 19 and a magenta colourant of Formula (1) as described and preferred above.

Component e), water, is preferably present in the composition in an amount of 35 to 55 parts and more preferably 40 to 50 parts. The water is preferably deionised.

The surfactant used as component f) may be ionic or, more preferably, non-ionic. Acetylenic diol surfactants are preferred (especially 2,4,7,9-tetramethyl-5-decyne-4,7-diol and ethylene oxide condensates thereof), for example Surfynol® surfactants and especially Surfynol® 465 available from Air Products.

Component f) is preferably present in the composition in an amount of 0.001 to 2.5 parts, more preferably 0.01 to 2 parts, especially 0.05 to 1 parts and more especially 0.1 to 0.5 parts.

For component g) any biocide (or mixture of biocides) which is stable in the ink may be used such as, for example Proxel® GXL available from Lonza. Component g) is preferably present in the composition in an amount of 0.001 to 1.5 parts, more preferably 0.01 to 0.5 parts, especially 0.01 to 0.3 parts.

In addition to the abovementioned components, the ink composition may optionally comprise one or more ink additives. Preferred additives suitable for IJP inks are pH adjusters and/or buffers, anti-kogation agents, rheology modifiers, corrosion inhibitors and chelating agents and additional dyes. Preferably, the total amount of all such additives is no more than 10 parts by weight.

In one embodiment the ink is free from pigments. In a further embodiment the ink is free from acrylic binders.

In view of the foregoing, a particularly preferred ink comprises:
a) 2 to 10 parts diethylene glycol;
b) 35 to 45 parts glycerol;
c) 2 to 7 parts 2-pyrrolidinone;
d) 0.6 to 8 parts water-soluble dye;
e) 35 to 55 parts water;
f) 0.05 to 1 part non-ionic surfactant;
g) 0.01 to 0.5 parts biocide;
wherein all parts are by weight. In this ink it is preferred that the viscosity is 3 to 10 cP, the surface tension is 25 to 45 dynes/cm and the pH is 6 to 10.

In view of the foregoing, a particularly preferred ink comprises:
a) 3 to 8 parts diethylene glycol;
b) 36 to 42 parts glycerol;
c) 4 to 6 parts 2-pyrrolidinone;
d) 1.5 to 7 parts water-soluble dye;
e) 40 to 50 parts water;
f) 0.1 to 0.5 parts non-ionic surfactant;
g) 0.01 to 0.3 part biocide;
wherein all parts are by weight. In this ink it is preferred that the viscosity is 4 to 7 cP, the surface tension is 30 to 40 dynes/cm and the pH is 7 to 9.5.

The number of parts of a) to g) preferably add up to 100. This is not to say that additional ingredients cannot be present, it merely defines the relative amounts of the specified components relative to one another. However, in one preferred embodiment no additional components are present.

Preferably the inks of the present invention comprise less than 3 parts, more preferably less than 2 parts, especially less than 1 part, more especially is free from ethylene glycol mono butyl ether.

Preferably, the ink composition has been filtered through a filter having a mean pore size of less than 10 microns, more preferably less than 5 microns and especially less than 1 micron.

According to a second aspect of the present invention there is provided an ink-set comprising a yellow ink, a magenta ink, a cyan ink and one or two black inks, wherein each ink independently is as hereinbefore described.

The colorants used in the yellow ink, magenta ink, cyan ink and black ink of the ink-set are preferably as described and preferred above in relation to the first aspect of the present invention.

Preferably the ink-set according to the second aspect of the invention comprises:
(i) a yellow ink which comprises C.I. Direct Yellow 86, C.I. Direct Yellow 132, C.I. Direct Yellow 142, Acid Yellow 23, Pro-Jet Yellow 746 or a mixture comprising two or more thereof, especially C.I. Direct Yellow 132;
(ii) a magenta ink which comprises C.I. Acid Red 249, C.I. Acid Red 52, a monoazo dye of Formula (1) (whether in free acid or salt form) as hereinbefore defined or a mixture thereof. It is particularly preferred that the magenta ink comprises C.I. Acid Red 249 and/or a monoazo dye of Formula (1);

(iii) a cyan ink which comprises C.I. Direct Blue 86 or C.I. Direct Blue 199, especially C.I. Direct Blue 199, or a mixture thereof; and
(iv) one or two black ink(s) which comprise, if more than one ink independently, C.I. Direct Black 19, C.I. Direct Black 168, Mobay Black SP, Bayscirpt Black SP, Steiner Black SP, or a dye of the Formula (3) or (4) (whether in free acid or salt form) or a mixture thereof, especially a mixture of dyes of the Formula (2) and (5) (whether in free acid or salt form) or a mixture thereof. In one preferred embodiment the black ink comprises C.I. Direct Black 19. In a second preferred embodiment the black ink comprises C.I. Direct Black 168 and C.I. Acid Red 249. If there are two black inks then preferably they comprise different colorants or different mixtures of colorants.

A more preferred ink-set according to the second aspect of the invention comprises:
(i) a yellow ink which comprises C.I. Direct Yellow 132;
(ii) a magenta ink which comprises C.I. Acid Red 249, C.I. Acid Red 52, a monoazo dye of Formula (2) (whether in free acid or salt form) as hereinbefore defined or a mixture thereof. It is particularly preferred that the magenta ink comprises C.I. Acid Red 249 and/or a monoazo dye of Formula (2);
(iii) a cyan ink which comprises C.I. Direct Blue 199; and
(iv) one or two black ink(s) which comprise, if more than one ink independently, C.I. Direct Black 19, C.I. Direct Black 168, Mobay Black SP or a mixture thereof. In one preferred embodiment the black ink comprises C.I. Direct Black 19. In a second preferred embodiment the black ink comprises C.I. Direct Black 168 and C.I. Acid Red 249. If there are two black inks then preferably they comprise different colorants or different mixtures of colorants.

The inks of the ink-set are each independently as described and preferred above in relation to the first aspect of the present invention.

According to a third aspect of the present invention there is provided a process for printing an image on a substrate comprising applying an ink according to the first aspect of the present invention or an ink-set according to the second aspect of the present invention to a substrate by means of an ink-jet printer.

The substrate is preferably a paper, a plastic film or a textile material. The paper may be a plain or treated paper, and may have an acid, alkaline or neutral character.

According to a fourth aspect of the present invention there is provided a material printed by means of a process according to the third aspect of the invention.

The material is preferably a paper, a plastic film or a textile material. The paper may be a plain or treated paper, and may have an acid, alkaline or neutral character.

According to a fifth aspect of the present invention there is provided an ink-jet printer comprising one or more ink vessels each comprising a chamber and an ink according to the first aspect of the present invention or an ink-set according to the second aspect of the present invention, wherein said ink is present in the one or more chambers.

The inks of the present invention are particularly useful for commercial printers, especially piezo ink-jet printers. They have a low tendency to block nozzles and are suitable for a wide variety of substrates. Good drop definition can be achieved with a low strike-through rate. This means the inks are suitable for use with light and/or thin substrates.

The invention is further illustrated by the following Examples in which all parts and percentages are by weight unless otherwise stated.

EXAMPLES 1 TO 4

Inks 1 to 4 were prepared by mixing the components specified in Table 1 in the number of parts indicated. The colorant column describes the number of parts of the bracketed colorant(s) included and the weight ratio where more than one colorant is included.

TABLE 1

Yellow and Cyan Inks
Example 1 - Yellow Ink
Example 2 - Cyan Ink

| Ink Component | Example 1 | Example 2 |
|---|---|---|
| Dye | DY 132 | DB 199 |
| Diethylene Glycol | 5% | 5% |
| Glycerol | 40.83% | 40.5% |
| 2-Pyrrolidone | 5% | 5% |
| Surfynol 465* | 0.864% | 0.458% |
| Proxel GXL | 0.1% | 0.1% |
| Dye | 2.7% | 3% |
| Water | to 100% | to 100% |

Footnote:
Surfynol® 465 is a surfactant from Air Products.
DY 132 is C.I. Direct Yellow 132.
DB 199 is C.I. Direct Blue 199.

TABLE 2

Magenta Inks
Example 3 - Magenta Ink 1
Example 4 - Magenta Ink 2

| Ink Component | Example 3 | Example 4 |
|---|---|---|
| Dye | AR 249 | Dye of Formula (2) |
| Diethylene Glycol | 5% | 5% |
| Glycerol | 41% | 42.5% |
| 2-Pyrrolidone | 5% | 5% |
| Surfynol 465* | 0.8% | 0.4% |
| Proxel GXL | 0.1% | 0.1% |
| Dye | 3% | 1.8% |
| Water | to 100% | to 100% |

AR 249 is C.I. Acid Red 249

TABLE 3

Black Inks
Example 5 - Black Ink 1
Example 6 - Black Ink 2
Example 7 - Black Ink 3

| Ink Component | Example 5 | Example 6 | Example 7 |
|---|---|---|---|
| Dye | DB168 plus AR 249 | DB 19 | Mobay Black |
| Diethylene Glycol | 5% | 5% | 5% |
| Glycerol | 36.7% | 36% | ? |
| 2-Pyrrolidone | 5% | 5% | 5% |
| Surfynol 465* | 0.7% | 0.64% | |
| Proxel GXL | 0.1% | 0.1% | 0.1% |
| Dye | DB168 3.85% AR 249 0.5% | 4.2% | |
| Water | to 100% | to 100% | to 100% |

DB 19 is C.I. Direct Black 19
DB 168 is C.I. Direct Black 168

TABLE 4

| | Example 8 - Ink Set 1 | |
| | Example 9 - Ink Set 2 | |
| Ink Component | Example 7 | Example 8 |
| --- | --- | --- |
| Yellow Ink | Yellow Ink | Yellow Ink |
| Cyan Ink | Cyan Ink | Cyan Ink |
| Magenta Ink | Magenta Ink 1 | Magenta Ink 2 |
| Black Ink | Black Ink 1 | Black Ink 2 |

Ink Jet Printing Properties

Example Inks 1, 2, 4 and 6 were printed by means of an ink-jet printer onto the following printing papers: Relative Optical Density (ROD) and CIE L*a*b* color space parameters measured at 100% depth.

Canon® GF500
UPM Brite 65C
Xerox® 4200

The Relative Optical Density (ROD) and CIE L*a*b* color space parameters measured at 100% depth of these prints were measured

TABLE 5

Print Properties on Canon GF 500

| Example Ink | ROD | L | a | b |
| --- | --- | --- | --- | --- |
| 1 | 1.64 | 83.72 | 3.17 | 98.36 |
| 2 | 1.57 | 47.83 | −22.9 | −41.83 |
| 4 | 1.43 | 46.21 | 70.45 | −0.35 |
| 6 | 1.61 | 18.28 | −1.64 | −4.42 |

TABLE 6

Print Properties on UPN Brite 65C

| Example Ink | ROD | L | a | b |
| --- | --- | --- | --- | --- |
| 1 | 1.4 | 79.78 | −0.14 | 82.07 |
| 2 | 1.38 | 50.49 | −26.95 | −33.73 |
| 4 | 1.35 | 45.45 | 64.79 | −3.85 |
| 6 | 1.58 | 19.19 | −1.94 | −5.56 |

TABLE 7

Print Properties on Xerox 4200

| Example Ink | ROD | L | a | b |
| --- | --- | --- | --- | --- |
| 1 | 1.52 | 84.77 | 2.27 | 95.77 |
| 2 | 1.45 | 50.42 | −20.36 | −44.93 |
| 4 | 1.33 | 47.66 | 69.13 | −1.97 |
| 6 | 1.5 | 21.23 | −1.89 | −5.47 |

Performance Properties

In order to assess the likelihood of the ink crusting over and blocking the nozzle of a commercial printer after a period of non-use, the ability of the aged ink to re-dissolve after standing may be assessed as follows.

The ink under evaluation may be warmed to 40° C. in the open air and maintained at this temperature for 24 hours. The remaining residue (0.2 g) should be weighed into a vial of capacity 10 cm$^3$ containing water (2 cm$^3$). The vial can then be shaken at a frequency of 120 cycles per minute and the time taken for the residue to re-dissolve recorded. A longer time to re-dissolve indicates a higher likelihood of crusting and nozzle blockage.

The invention claimed is:
1. An ink composition comprising:
   a) 2 to 10 parts of one or more glycols selected from the group consisting of ethylene glycol, diethylene glycol, propylene glycol or dipropylene glycol;
   b) 30 to 50 parts of glycerol;
   c) 0.5 to 10 parts of 2-pyrrolidone;
   d) 0.5 to 9 parts of a water-soluble dye;
   e) 30 to 70 parts of water;
   f) 0 to 3 parts of surfactant;
   g) 0 to 5 parts biocide;
   wherein all parts are by weight.
2. The ink composition as claimed in claim 1 wherein the ink has a viscosity at 32° C. of 4 to 8 cP.
3. The ink composition as claimed in claim 1 wherein component a) is diethylene glycol.
4. The ink composition as claimed in claim 1 wherein component b) is present in an amount of from 35 to 45 parts by weight.
5. The ink composition as claimed in claim 1 wherein component c) is present in an amount of from 2 to 7 parts by weight.
6. The ink composition as claimed in claim 1 wherein component d) is present in an amount of from 1 to 7.5 parts by weight.
7. The ink composition as claimed in claim 1 wherein component d) comprises a yellow colorant selected from the group consisting of C.I. Direct Yellow 86, C.I. Direct Yellow 132, C.I. Direct Yellow 142, Acid Yellow 23, mixed lithium sodium 1-{5-[(2-carboxy-4-sulfophenyl)hydrazono]-2-hydroxy-4-methyl-6-oxo-5,6-dihydropyridin-3-yl}pyridinium-3-carboxylate, and mixtures thereof.
8. The ink composition as claimed in claim 1 wherein component d) comprises a magenta colorant selected from the group consisting of Acid Red 249; a xanthene dyes; and monoazo dyes of Formula (1), and salts thereof

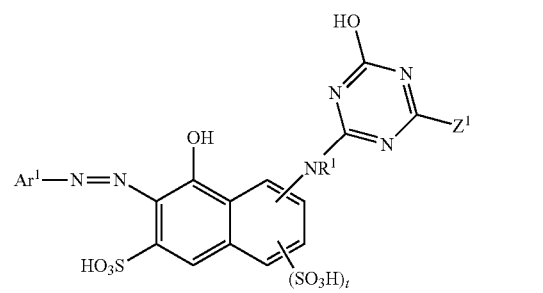

Formula (1)

wherein:
   $Ar^1$ is optionally substituted phenyl or optionally substituted naphthyl;
   $Z^1$ is an optionally substituted nitrogen containing heterocyclic group which is attached to the triazine ring by a bond to a nitrogen atom in the heterocyclic group;
   $R^1$ is H or $C_{1-4}$-alkyl optionally substituted by —OH, —COOH or —SO$_3$H; and
   t is 0 or 1:
   and mixtures thereof.
9. The ink composition as claimed in claim 1 wherein component d) comprises a cyan colorant selected from the group consisting of C.I. Direct Blue 86, C.I. Direct Blue 199 and mixtures thereof.

10. The ink composition as claimed in claim 1 wherein component d) comprises a black colorant selected from the group consisting of C.I. Direct Black 19, C.I. Direct Black 168, or a compound of the Formula (3) or (4) and mixtures thereof wherein Formula (3) is:

T-Q-N=N-L-T      Formula (3)

wherein:
each T independently is an azo containing group;
Q is an optionally substituted, optionally metallized 1,8-dihydroxynaphthyl group; and
L is a divalent organic linker group: and
Formula (4) is

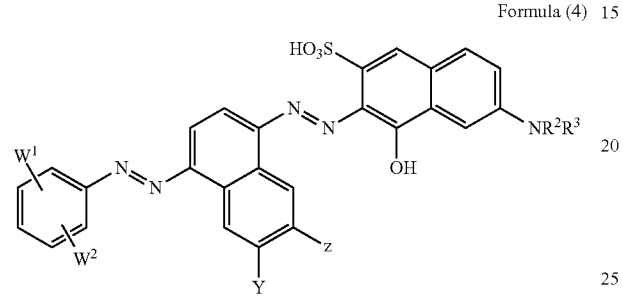

Formula (4)

wherein:
W¹ is carboxy;
W² is H, carboxy, sulfo, halo, hydroxy, $C_{1-4}$-alkoxy or $C_{1-4}$-alkyl;
Y and Z are each independently H, carboxy or sulfo; and
R² and R³ are each independently H, $C_{1-4}$-alkyl or $C_{1-4}$-alkyl carrying a carboxy or sulfo group.

11. An ink-set comprising a yellow ink, a magenta ink, a cyan ink and one or two black inks, wherein each ink independently is as described in claim 1.

12. The ink-set as claimed in claim 11 which comprises:
(i) a yellow ink which comprises C.I. Direct Yellow 86, C.I. Direct Yellow 132, C.I. Direct Yellow 142, C.I. Acid Yellow 23, mixed lithium sodium 1-{5-[(2-carboxy-4-sulfophenyl)hydrazono]-2-hydroxy-4-methyl-6-oxo-5,6-dihydropyridin-3-yl}pyridinium-3-carboxylate, or a mixture comprising two or more thereof;
(ii) a magenta ink which comprises C.I. Acid Red 249, C.I. Acid Red 52, a monoazo dye of Formula (1),

Formula (1)

wherein:
Ar¹ is optionally substituted phenyl or optionally substituted naphthyl;
Z¹ is an optionally substituted nitrogen containing heterocyclic group which is attached to the triazine ring by a bond to a nitrogen atom in the heterocyclic group;
R¹ is H or $C_{1-4}$-alkyl optionally substituted by —OH, —COOH or —SO₃H; and
t is 0 or 1:
or a mixture thereof;
(iii) a cyan ink which comprises C.I. Direct Blue 86 or C.I. Direct Blue 199, or a mixture thereof; and
(iv) one or two black ink(s) which comprise, if more than one ink independently, C.I. Direct Black 19, C.I. Direct Black 168, or a dye of the Formula (3) or (4), where Formula (3) is:

T-Q-N=N-L-T      Formula (3)

wherein:
each T independently is an azo containing group;
Q is an optionally substituted, optionally metallized 1,8-dihydroxynaphthyl group; and
L is a divalent organic linker group: and
Formula (4) is

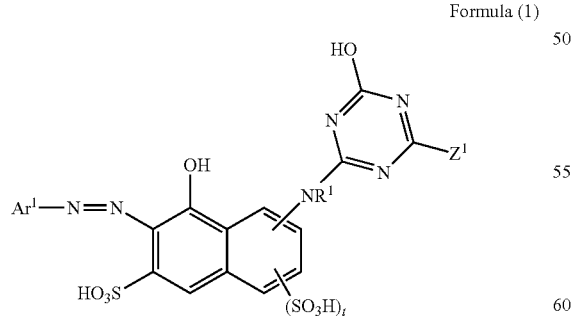

Formula (4)

wherein:
W¹ is carboxy;
W² is H, carboxy, sulfo, halo, hydroxy, $C_{1-4}$-alkoxy or $C_{1-4}$-alkyl;
Y and Z are each independently H, carboxy or sulfo; and
R² and R³ are each independently H, $C_{1-4}$-alkyl or $C_{1-4}$-alkyl carrying a carboxy or sulfo group or a mixture thereof.

13. A process for printing an image on a substrate comprising applying an ink according to claim 1 to a substrate by means of an ink-jet printer.

14. A material printed by means of a process according to claim 13.

* * * * *